United States Patent [19]
Furohashi et al.

[11] Patent Number: 5,337,349
[45] Date of Patent: Aug. 9, 1994

[54] IMAGE TELECOMMUNICATION APPARATUS

[75] Inventors: Ikuko Furohashi, Yokohama; Yoshihiro Miyake, Fujisawa; Takao Yokoyama, Tokyo, all of Japan

[73] Assignee: Matsushita Graphic Communication Systems, Inc., Tokyo, Japan

[21] Appl. No.: 896,777

[22] Filed: Jun. 10, 1992

[30] Foreign Application Priority Data

Nov. 18, 1991 [JP] Japan .................................. 3-301569
Nov. 18, 1991 [JP] Japan .................................. 3-301570

[51] Int. Cl.$^5$ ...................... H04M 11/00; H04M 1/00
[52] U.S. Cl. ........................................ 379/100; 379/94; 379/355; 379/356; 358/400
[58] Field of Search ................ 379/355, 356, 357, 93, 379/94; 358/440, 400

[56] References Cited

U.S. PATENT DOCUMENTS

| | | | |
|---|---|---|---|
| 4,741,021 | 4/1988 | Kotani et al. | 379/355 |
| 4,920,560 | 4/1990 | Kageyama | 379/355 |
| 5,018,189 | 5/1991 | Kurosawa et al. | 379/100 |
| 5,134,653 | 7/1992 | Satomi et al. | 379/355 |
| 5,191,604 | 3/1993 | Shigeeda | 379/100 |
| 5,216,705 | 6/1993 | Yoshida et al. | 379/355 |

FOREIGN PATENT DOCUMENTS

0110849  5/1988  Japan .................................. 379/355

*Primary Examiner*—Curtis Kuntz
*Assistant Examiner*—Jason Chan
*Attorney, Agent, or Firm*—Lowe, Price, LeBlanc & Becker

[57] ABSTRACT

A first aspect of the present invention provides a facsimile machine comprising: a memory storing shortening telephone numbers; a calling device accessing to a line to carry out dialing operation; a mode detector detecting a shortening dial command mode inputted from outside; a dialing number detector detecting the inputted shortening dial number; and a controller effecting the dialing number detector to detect the shortening dial number to be inputted in response to an output of the mode detector, and reading out a telephone number corresponding to the detected shortening dial number from the memory so as to enable the calling device to carry out its dialing operation. And further, a second aspect of the present invention provides a facsimile machine wherein a telephone and a facsimile are equipped and further there is provide an automatic receiving mode which is operative to connect the telephone prior to the facsimile when received a call, the facsimile machine comprising: a voice message storing device storing a voice message sent out to an opposite terminal during a receiving response procedure; a signal detector detecting a special signal sent out from the opposite terminal; and a controller immediately interrupting the voice message being sent out from the voice message storing device whenever the signal detector detects the special signal, and immediately starting facsimile.

5 Claims, 10 Drawing Sheets

IMAGE TELECOMMUNICATION APPARATUS

BACKGROUND OF THE INVENTION

1. Field of the Invention

The present invention relates to an image telecommunication apparatus which includes an external telephone so as to selectively function as a telephone or an image telecommunication devices, particularly to an image telecommunication apparatus which includes a memory unit for memorizing shortening telephone numbers utilized specially for image telecommunication purpose but can allow the external telephone to utilize these shortening telephone numbers in view of facilitating its dialing operation.

And further, the present invention relates to an image telecommunication apparatus which can promptly complete an image telecommunication procedure in the case where an image telecommunication apparatus receives facsimile message transmitted from an outer manually operated image telecommunication apparatus, while standing by in a condition wherein a telephone call is automatically received prior to image telecommunication (hereinafter, referred to as a TEL-prioritized automatic receiving mode).

2. Description of the Prior Art

Figure 9:
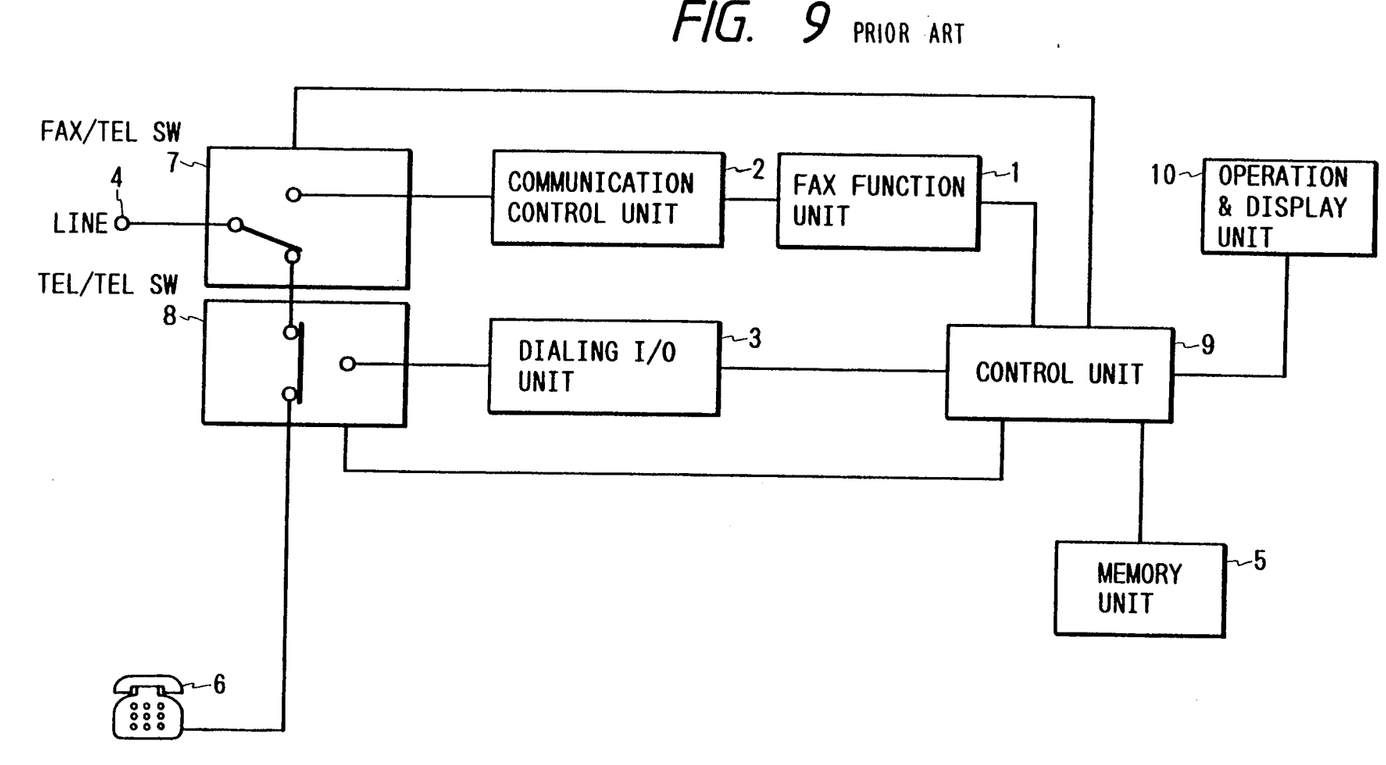
FIG. 9 is a schematic block diagram showing a conventional image telecommunication apparatus.

Recently, an image telecommunication apparatus such as a facsimile etc. is usually equipped with an external telephone so that the image telecommunication apparatus can be used not only for the image telecommunication but for ordinary telephone conversation. FIG. 9 is an example, showing a conventional facsimile machine.

In FIG. 9, a reference numeral 1 denotes a facsimile function unit for processing image (its details is explained later), and a reference numeral 2 denotes a telecommunication control unit 2 including a network control portion and a modem to control a facsimile telecommunication operation. A reference numeral 3 denotes a dialing I/O unit provided as a telephone function portion so as to constitute a facsimile machine together with the facsimile function unit 1.

A reference numeral 5 denotes a memory unit for storing shortening telephone numbers, and a reference numeral 6 denotes an external telephone connected to a line 4 in parallel with the facsimile function portion 1. A reference numeral 7 denotes a FAX/TEL switch provided for changing over the connection of the line 4 between the facsimile function portion 1 and the telephone function portion including the dialing I/O unit 3 and the external telephone 6. A reference numeral 8 denotes a TEL/TEL switch provided for changing over the connection of the line 4 between the dialing I/O unit 3 and the external telephone 6.

A reference numeral 9 denotes a control unit for controlling each operations of telephone function and facsimile function. A reference numeral 10 denotes an operation & display unit for inputting various instructions necessary for performing the facsimile telecommunication and displaying its operational condition. The dialing I/O unit 3 performs both dialing and receiving operations for telephone calls.

With this arrangement, in the case where the facsimile telecommunication is carried out, the facsimile machine initiates its operation when facsimile telecommunication commands are input from the operation & display unit 10 to the control unit 9. And, the control unit 9 not only changes over the TEL/TEL switch 8 to the dialing I/O unit 3 side, but reads out the corresponding telephone number from the memory unit 5, in case of shortening dialing, to send it to the dialing I/O unit 3.

When the dialing I/O unit 3 receives this telephone number, it catches hold of the line 4 for dialing. Then, if an opposite terminal returns a receiving response, the control unit 9 changes over the FAX/TEL switch 7 to the facsimile function unit 1 side so that the facsimile telecommunication operation can be carried out under the telecommunication control unit 2.

On the other hand, in the case where the external telephone 6 is used for telephone conversation, it is carried out simply in such a manner that a handset of the external telephone is taken up and then the telephone number is inputted through dial keys to catch hold of the line 4.

In such a conventional facsimile machine even if it has a function for enabling an operator to dial by a one touch dial operation or a shortening dial operation and so on (hereinafter, referred to as a "shortening dialing", collectively), if the external telephone 6 has only a single function, an operator has no measure other than directly dialing the telephone number of an opposite terminal. On the other hand, in the case where the external telephone 6 has multi-function, an operator needs to duplicatively register the same number in the memory installed in the external telephone 6 since the shortening dialing function provided exclusively for the facsimile apparatus cannot be utilized for this external telephone 6.

That is, there was no measure other than utilizing a function of the external telephone 6 itself after registering the telephone number of the opposite terminal or directly dialing as well as a single-function telephone. Thus, the function of the facsimile apparatus has been utilized only for the facsimile itself and could not be commonly utilized for the external telephone 6.

Furthermore, among various facsimile machines, there is a popular facsimile machine which is given a priority to its telephone function rather than its facsimile function. The Japanese Unexamined Patent Application No. SHO63-211960 or FIGS. 7 and 8 discloses this type of conventional facsimile machine.

Figure 7:
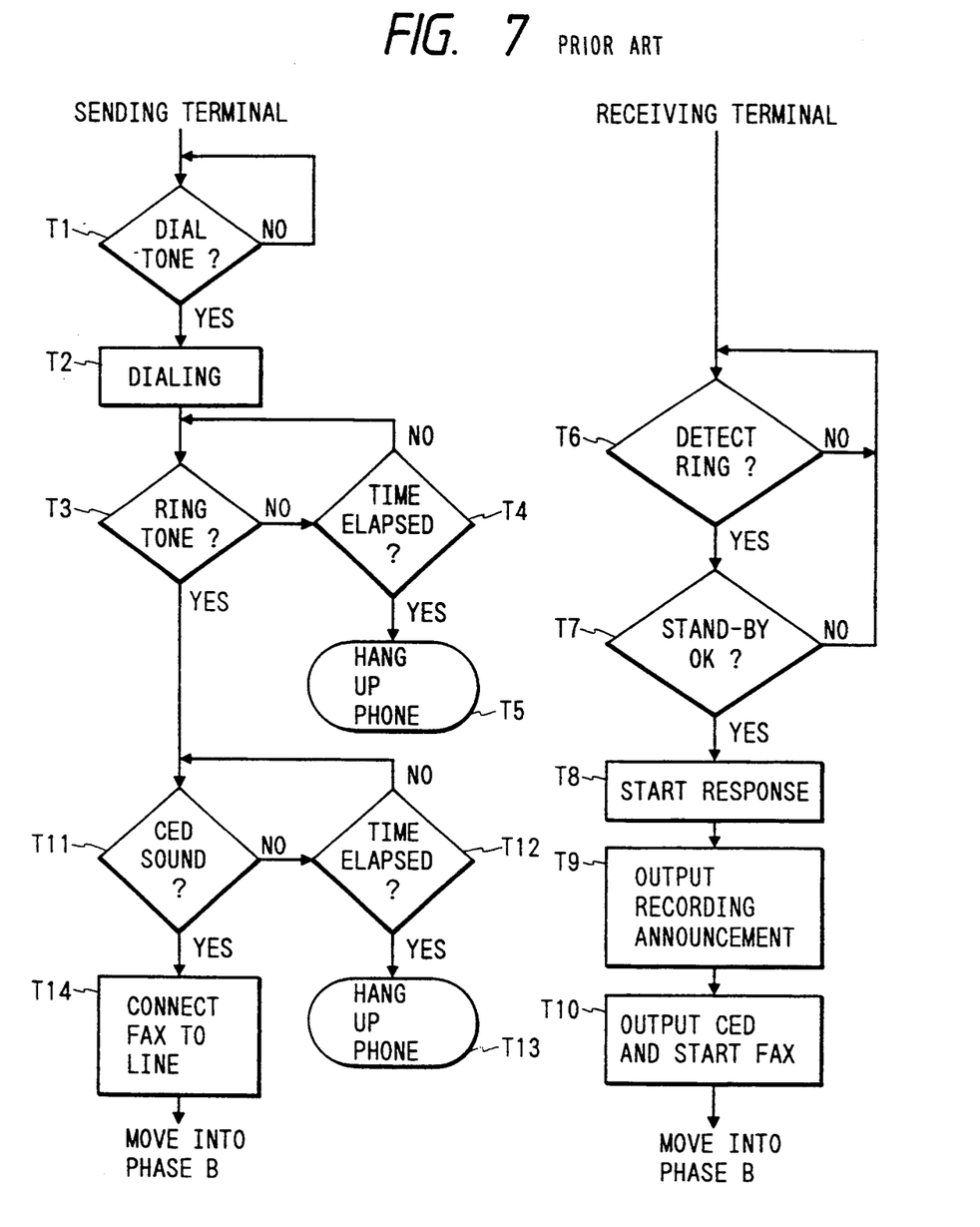
FIG. 7 is a flow chart illustrating a sending operation in a sending terminal and a receiving operation in a receiving terminal in a conventional image telecommunication apparatus.

A flow chart shown in FIG. 7 shows a sending function operated in a sending terminal and a receiving function operated in a receiving terminal.

The sending terminal carries out its sending operation as follows. In step T1, an operator of the sending terminal checks whether or not he can hear a dial tone. If the operator hears the dial tone in the step T1, he carries out a dialing operation in a step T2. In turn, it is checked whether or not a ring tone returns within a predetermined time through steps T3, T4. And, if rings tone does not return within a predetermined time, the operator hangs up the telephone in a step T5. To the contrary, if the ring tone returns, the operator keeps waiting a response coming back from the receiving terminal.

On the other hand, the receiving terminal carries out its receiving operation as follows. In a step T6, it is checked whether or not the ring is detected in response to the dialing operation in the previous step T2 of the sending terminal. If the ring has been detected, it is further checked in a step T7 whether or not the receiving terminal is in a stand-by OK condition for subsequent receiving operation.

If it is judged that the receiving terminal is in a stand-by OK condition, the receiving terminal starts its receiving response procedure in a step T8. And, in the following step T9, the receiving terminal sends out a recording announce so as to transmit a voice message, telling that the receiving is an a TEL-prioritized automatic receiving mode wherein the a telephone means is connected to the line prior to a facsimile means; that is, the telephone means is given priority.

Figure 8:
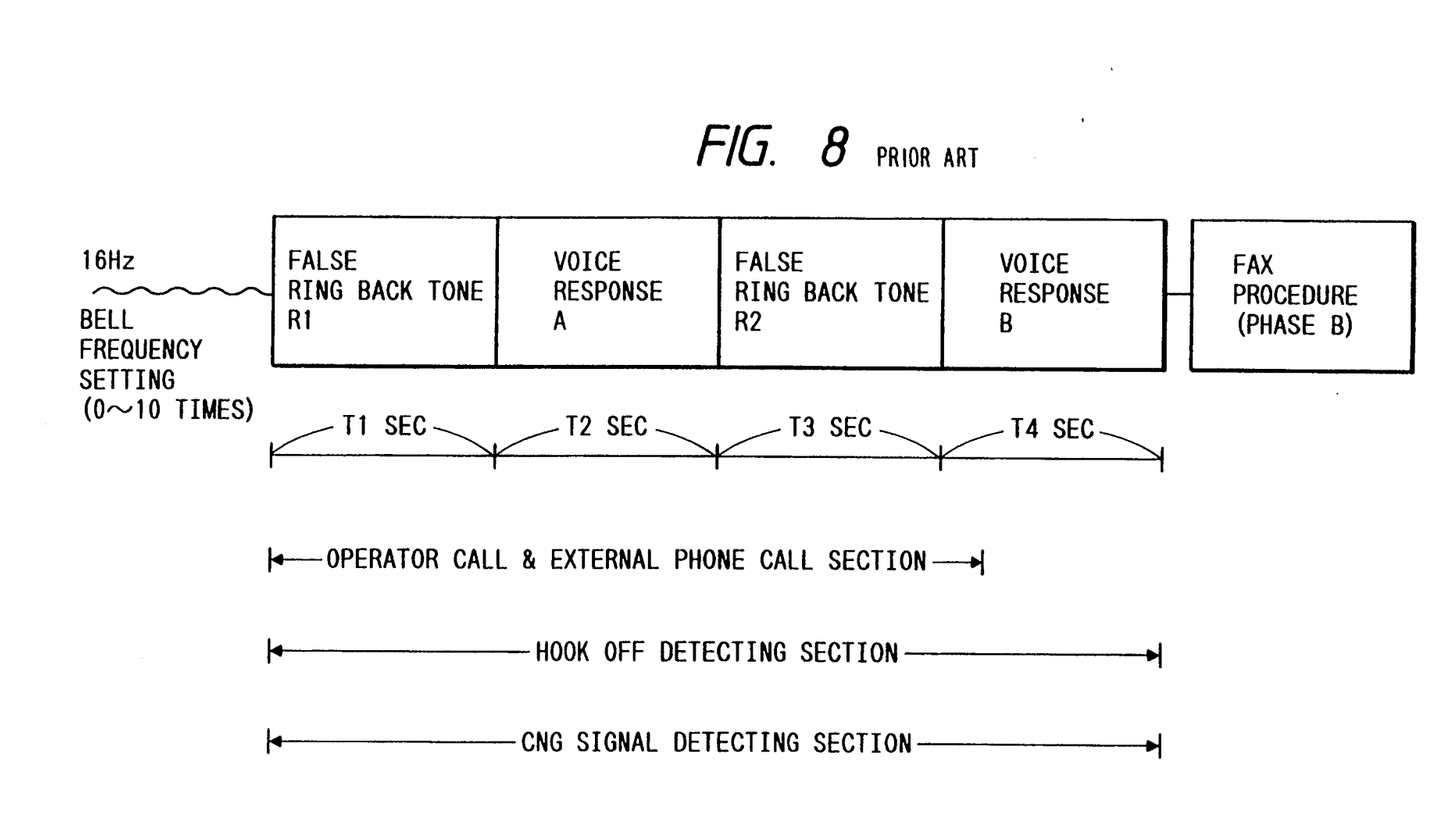
FIG. 8 is a view illustrating a part of the receiving operation in the receiving terminal of above conventional image telecommunication apparatus in more detail.

A specific example of the detail operation performed in the previous steps T8 and T9 is shown in FIG. 8.

As shown in FIG. 8, when a ball signal of 16 Hz is detected, first of all, a false ring back tone R1 is sent out for a time period of T1. And, subsequently, a voice response A is sent out for a time period of T2. The voice response A is outputted in a form of a recording announce or a speech synthesis, telling for example, "Now, it is calling. Please wait for a while."

After this voice response A, a false ring back tone R2 is sent out for a time period of T3, And, subsequently, a voice response B is sent out for a time period of T4. The voice response B is outputted similarly in a form of a recording announce or a speech synthesis, telling for example, "There is no one responding this call. If you want to send a facsimile, please send it after a beep sound"

A time duration after the sending-out of the false ring back tone R1 is initiated until a timing the voice response B is sent out corresponds to an operator call & external telephone call section for the receiving terminal. And, a time duration after the sending-out of the false ring back tone R1 is initiated until the sending-out of the voice response B is finished corresponds to a hook off section for the receiving terminal, and also corresponds to a calling tone (i.e. CNG) detecting section. The calling tone (i.e. CNG) represents a calling side non-voice terminal.

After having finished the sending-out operation of the voice response B, the receiving terminal sends out a CED which represents a called side terminal discriminating signal, in a step T10 and, in turn, moves into a phase B.

On the other hand, the sending terminal is in a hook off detecting condition after finishing the dialing operation and keeps waiting for the CED by checking whether or not the CED sound is heard in a step T11. Then, if a certain long time has elapsed without listening the CED sound in steps 11, 12, the telephone is hung up in a step T13. To the contrary, if the CED sound is heard, the operator pushes a start button for starting the facsimile communication so as to connect the facsimile machine to the line in a step T14 and, in turn, moves into the phase B.

SUMMARY OF THE INVENTION

The present invention has a purpose, in view of above problems and disadvantages encountered in the conventional art, to provide an image telecommunication apparatus which enables the external telephone to utilize the shortening dialing function of the facsimile apparatus.

To accomplish this purpose, a first aspect of the present invention provides an image telecommunication apparatus comprising a memory for storing shortening telephone numbers, a calling means for accessing to a line to carry out a dialing operation, a mode detecting means for detecting a shortening dial command mode inputted from outside, a dialing number detecting means for detecting a shortening dial number inputted from the outside, and a control means for effecting the dialing number detecting means to detect the shortening dial number to be inputted in response to an output of the mode detecting means, and reading out a telephone number corresponding to the shortening dial number detected by the dialing number detecting means so as to enable the calling means to carry out its dialing operation.

With this arrangement, when the external telephone is used for ordinary telephone conversation, the external telephone can be connected to the line by simply taking up a handset of the external telephone. And then, if a shortening dial command is outputted from the external telephone in response to manipulation of operation keys, the mode detecting means detects this shortening dial command and transmits it to the control means.

The control means changes over the line to connect to the facsimile apparatus and reads out the telephone number corresponding to the shortening dial command and further enables the calling means to carry out its dialing operation.

Furthermore, the present invention has a purpose, in view of above problems and disadvantages encountered in the conventional art, to provide an image telecommunication apparatus capable of promptly initiating the facsimile transmission procedure even when the receiving terminal is kept waiting in the TEL-prioritized automatic receiving mode.

To this end, a second aspect of the present invention provides an image telecommunication apparatus wherein a telephone means and an image telecommunication means are equipped and further there is provide an automatic receiving mode which is operative to connect the telephone means to the line prior to the image telecommunication means when received a call, said image telecommunication apparatus comprising: a voice message storing means for storing a voice message sent out to an opposite terminal during a receiving response procedure; a signal detecting means for detecting a special signal sent out from the opposite terminal; and a control means for immediately interrupting the voice message being sent out from the voice message storing means whenever the signal detecting means detects the special signal.

With this arrangement, if a sending terminal dials to a receiving terminal under the condition where this receiving terminal is kept waiting in the TEL-prioritized automatic receiving mode, the receiving terminal responds this dialing operation by sending out ring back tones and voice messages to the sending terminal during a predetermined time. And, if the special signal is sent out from the sending terminal, the receiving terminal immediately interrupts the receiving response by the ring back tones and the voice messages, and allows the sending terminal to transmit facsimile messages.

The above and other objects, features and advantages of the present invention will become more apparent from the following detailed description which is to be read in conjunction with the accompanying drawings.

DETAILED DESCRIPTION OF THE PREFERRED EMBODIMENT

Hereinafter, referring now to the accompanying drawings, an embodiment of the present invention is explained in detail.

1. Common USA of Shortening Dialing Function

Figure 1:
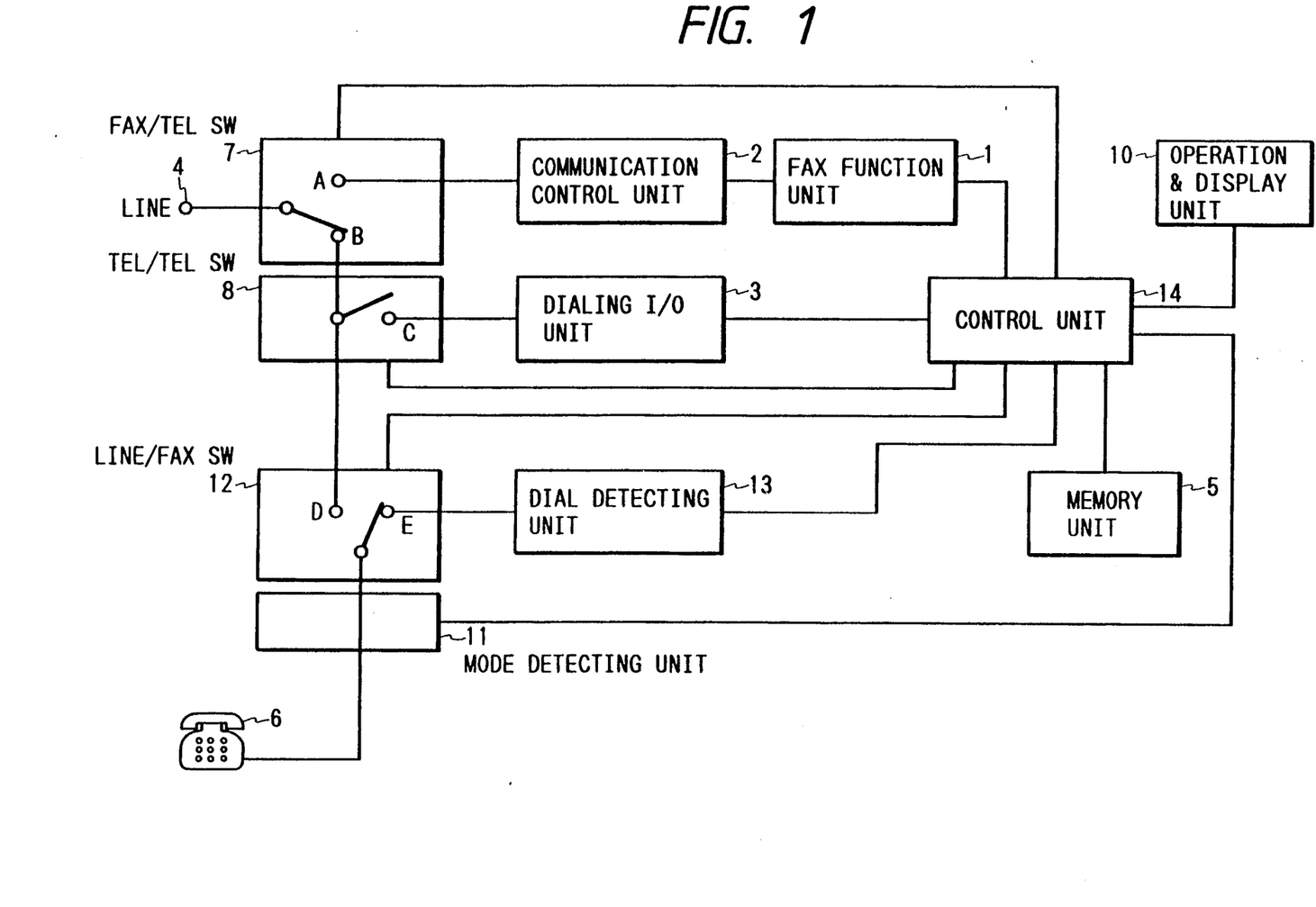
FIG. 1 is a schematic block diagram showing an image telecommunication apparatus in accordance with one embodiment of the present invention.
Figure 2A:
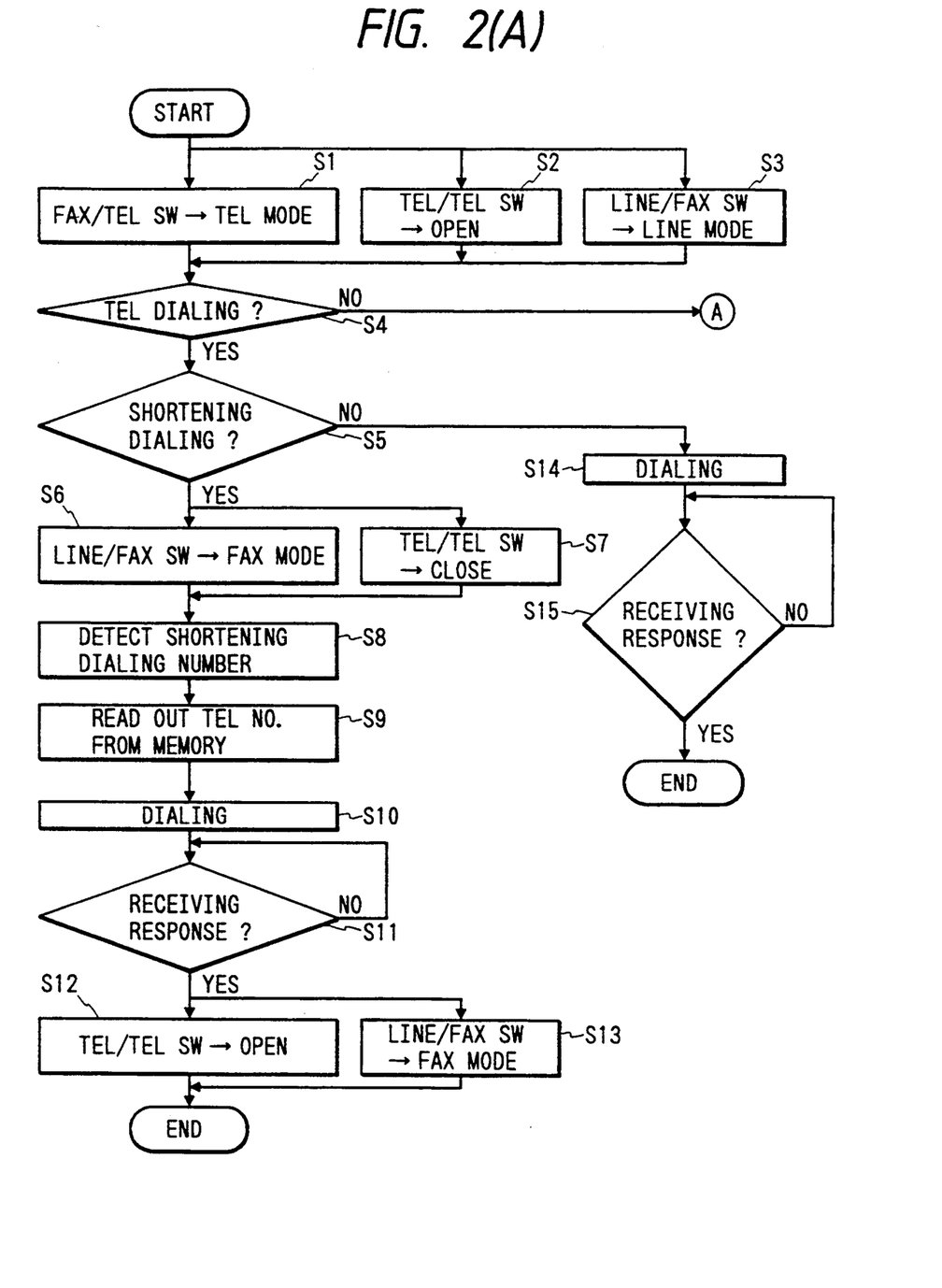
FIGS. 2(A) and 2(B) are flow charts showing performance of control means in the image telecommunication apparatus shown in FIG. 1.
Figure 2B:
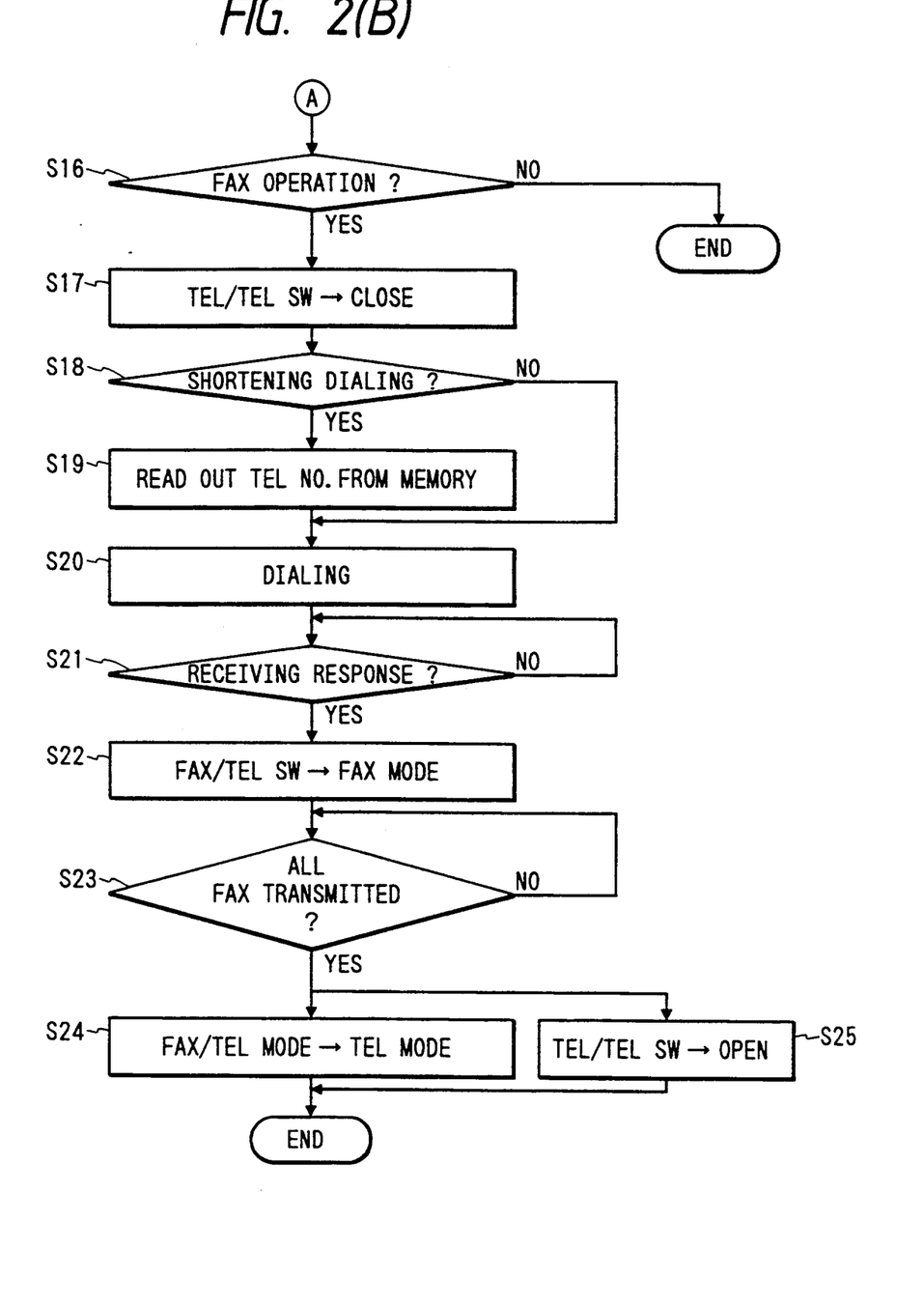

First of all, a first aspect of the present invention is explained in detail, referring now to FIGS. 1, 2(A) and 2(B).

FIG. 1 is a block diagram showing an image telecommunication apparatus in accordance with the present invention. In FIG. 1, the same portion as the conventional example shown in FIG. 9 is suffixed with the same reference numeral and its explanation is omitted here for avoiding duplicate explanations.

In the drawing, a reference numeral 11 denotes a mode detecting unit for detecting a dial calling mode of the external telephone 6, and a reference numeral 12 denotes a LINE/FAX switch provided for changing over the connection of the external telephone 6 between the line 4 and the facsimile apparatus. A reference numeral 13 denotes a dial detecting unit for detecting an input of numerical keys inputted from the external telephone 6.

A reference numeral 14 is a control unit which not only controls the facsimile telecommunication operation but reads out a telephone number corresponding to the shortening dialing number inputted from the external telephone 6 from the memory unit 5. And, the control unit 14 allows the dialing I/O unit 13 to perform its dialing operation.

Referring to FIGS. 2(A) and 2(B), and operation of the facsimile constituted as above-described is explained hereinafter.

First of all, the control unit 14 initializes all the switches. That is, the FAX/TEL switch 7 is switched to the TEL mode (i.e. a point B in FIG. 1) in a step S1, and the TEL/TEL switch 8 is opened. Further, the LINE/FAX switch 12 is switched to the LINE mode (i.e. a point D in FIG. 1).

Then, it is checked in a step S4 whether or not the external telephone 6 is picked up for dialing; i.e. whether or not the handset of the external telephone 6 is taken up. If the judgement in the step S4 is YES, the program proceeds to a step S5 to further check whether or not the dialing is a shortening dial. In this case, the mode detecting unit 11 detects the shortening command outputted from the external telephone 6, and transmits it to the control unit 14.

If the judgement in the step S5 is YES, the program proceeds to steps S6 and S7. In the step S6, the LINE/FAX switch 12 is switched to the FAX mode (i.e. a point E in FIG. 1). And, in the step S7, the TEL/TEL switch 8 is closed. Then, in a step S8, the dial detecting unit 13 detects the shortening dial number inputted from the numerical keys of the external telephone 6 and transmits it to the control unit 14.

Subsequently, the control unit 14 accesses memory unit 5 to read out the telephone number corresponding to the shortening dialing number and sends it to the dialing I/O unit 3 in a step S9. Then, the control unit 14 causes the dialing I/O unit 3 to perform its dialing operation in a step S10.

Next, it is checked whether or not an opposite terminal returns a receiving response; that is, whether or not the dialing I/O unit 3 catches hold the line 4, in a step S11. If the judgement in the step S11 is NO, the program repeats the same step S11 until the receiving response is returned.

If the judgement in the step S11 is YES, the program proceeds to steps S12 and S13. In the step S12, the TEL/TEL switch 8 is returned to the opened condition. In the step S13, the LINE/FAX switch 12 is changed over again to the LINE mode (i.e. the point D in FIG. 1) Then, the control unit 14 ends the program.

Returning to the step S5, if the judgement in the step S5 is NO, the program proceeds to a step S14. In the step S14, the control unit 14 enables the external telephone 6 to directly dial without changing conditions of all the switches, 7, 8, and 12.

Then, the program proceeds to the next step S15 to check whether or not an opposite terminal returns a receiving response; that is, whether or not the dialing I/O unit 3 catches hold the line 4. If the judgement in the step S15 is NO, the program repeats the same step S15 so as to keep waiting the receiving response coming back. To the contrary, if the judgement in the step S15 is YES, the control unit 14 ends the program. Furthermore, returning to the step S4, if the judgement in the step S4 is NO, the program goes to a step S16. In the step S16, it is checked whether or not the operation keys for the facsimile telecommunication is operated. If the judgement in the step S16 is NO, the control unit 14 ends the program.

If the judgement in the step S16 is YES, the program proceeds to a step S17 to close the TEL/TEL switch 8. Then, in a subsequent step S18, it is further checked whether or not the dialing is a shortening dial.

If the judgement in the step S18 is YES, the control unit 14 accesses to the memory unit 5 to read out the telephone number corresponding to the shortening dialing number and sends it to the dialing I/O unit 3 in a step S19. Then, the control unit 14 effects the dialing I/O unit 3 to perform its dialing operation in a step S20. On the other hand, if the judgement in the step S18 is NO, the program skips the step S19 and goes to the step S20.

Next, it is checked whether or not an opposite terminal returns a receiving response; that is, whether or not the dialing I/O unit 3 catches hold the line 4, in a step S21. If the judgement in the step S21 is NO, the program repeats the same step S21 until the receiving response is returned.

If the judgement in the step S21 is YES, the program proceeds to step S22. In the step S22, the FAX/TEL switch 7 is switched to the FAX mode (i.e. a point A in FIG. 1). And then, it is checked in a step S23 whether or not all the facsimile messages are transmitted. If the judgement in the step S23 is NO, the program repeats the same step S23 until all the facsimile messages is finished.

If the judgement in the step S23 is YES, the program proceeds to the following steps S24 and S25. In the step S24, the FAX/TEL switch 7 is changed over again to the TEL mode (i.e. the point B in FIG. 1) And, in the step S25, the TEL/TEL switch is opened. Then, the control unit 14 ends the program.

Accordingly, in accordance with the first aspect of the present invention, the facsimile apparatus can enable the external telephone to utilize the shortening dialing function which is exclusively provided for facsimile telecommunication.

2. Prompt Facsimile Transmission Procedure

Referring now to FIGS. 3 through 6, a second aspect of the present invention is explained in detail hereinafter.

Figure 3:
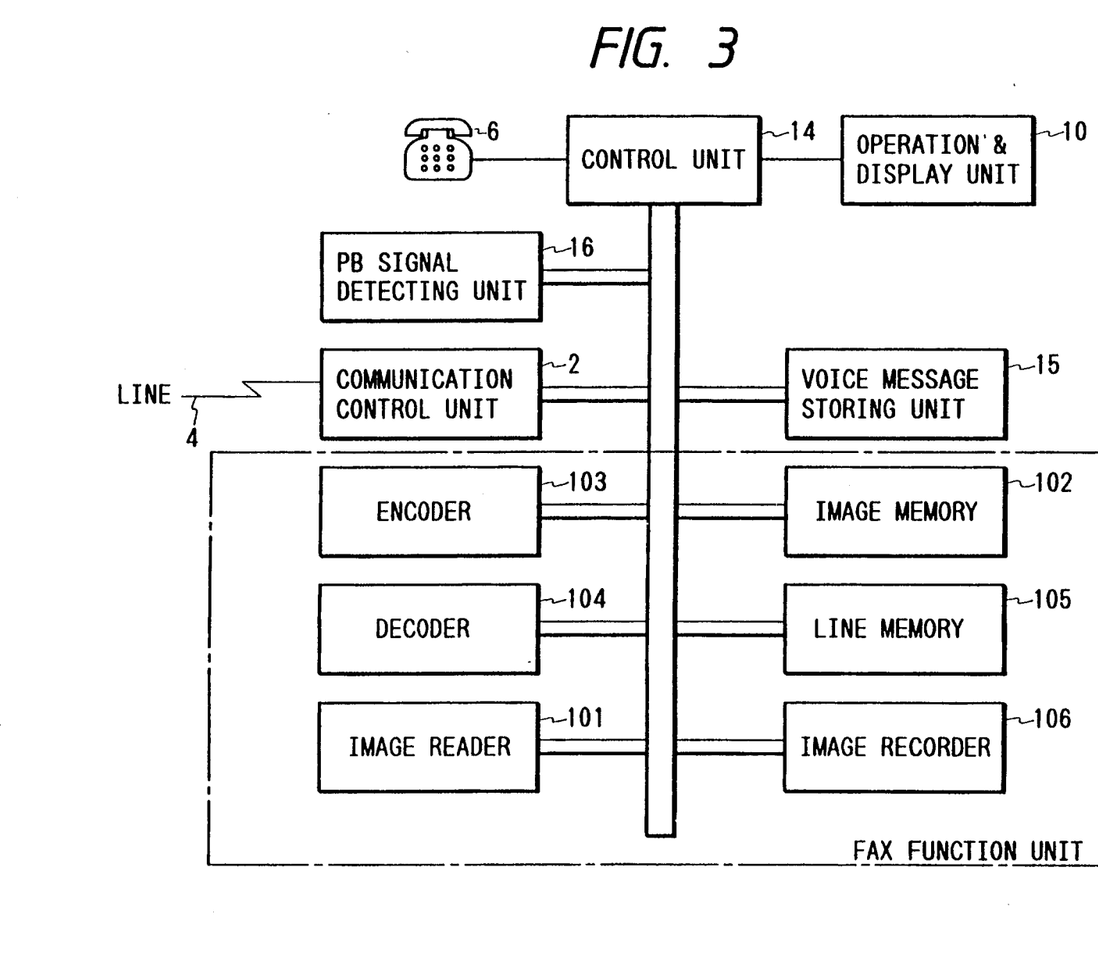
FIG. 3 is a schematic block diagram showing a constitution of the image telecommunication apparatus in accordance with the embodiment of the present invention.

In FIG. 3, the facsimile function unit 1 previously explained with reference to FIG. 1 is illustrated in more detail. That is, the facsimile function unit 1 consists essentially of six functional portions. A reference numeral 101 denotes an image reader for reading manuscripts to produce image data, and a reference numeral 102 denotes an image memory for storing the image date produced in the image reader 101. A reference numeral 103 denotes an encoder for encoding image data to be transmitted, and a reference numeral 104 denotes a decoder for decoding received encoded data. A reference numeral 105 denotes line memory for temporary storing decoded image date before a print-out operation, and a reference numeral 106 denotes an image recorder for outputting the image data just received or the image data stored in the image memory 102 in the form of hard copies.

In the drawing, the operation & display unit 10 is equipped with various operation keys for setting various operating modes of the facsimile apparatus and a display device for displaying the operating modes etc. The communication control unit 2 includes a modem for modulating and demodulating image data and a network control portion for performing dialing and receiving operations. And, the communication control unit 2 is connected to the line 4 and realizes a facsimile transmission in accordance with a predetermined control procedure.

Furthermore, a reference numeral 15 denotes a voice message storing unit which stores voice messages outputted in the receiving response procedure. A reference numeral 16 denotes a PB signal detecting unit which detects an interruption signal sent out from the sending terminal (i.e. the opposite facsimile machine).

The control unit 14 is connected with the external telephone 6 and all of above-described means 2, 10, 15, 16, and 101 through 106. By the way, some of means illustrated in FIG. 1 are omitted in FIG. 3 since these means are not related to the second aspect of the present invention.

The image reader 101 includes a means, such as a CCD image sensor, for converting a photo signal obtained by reading a manuscript into an electric signal. And, the image memory 102 adopts a page memory so that the image data read in the image reader 101 can be stored in a form of pages.

A message pre-recorded in a magnetic recording medium or a message produced by means of a speech synthesis medium are used as the voice message in this embodiment.

The PB signal expresses a signal generated when a push button is pushed down and is utilized as the interruption signal in this embodiment. The control unit 14 includes a CPU, a ROM, and a RAM for operating its programs and storing necessary control data. The ROM in the control unit 14 stores data for checking whether or not a PB signal fed from the sending terminal is the interruption signal.

Figure 4:
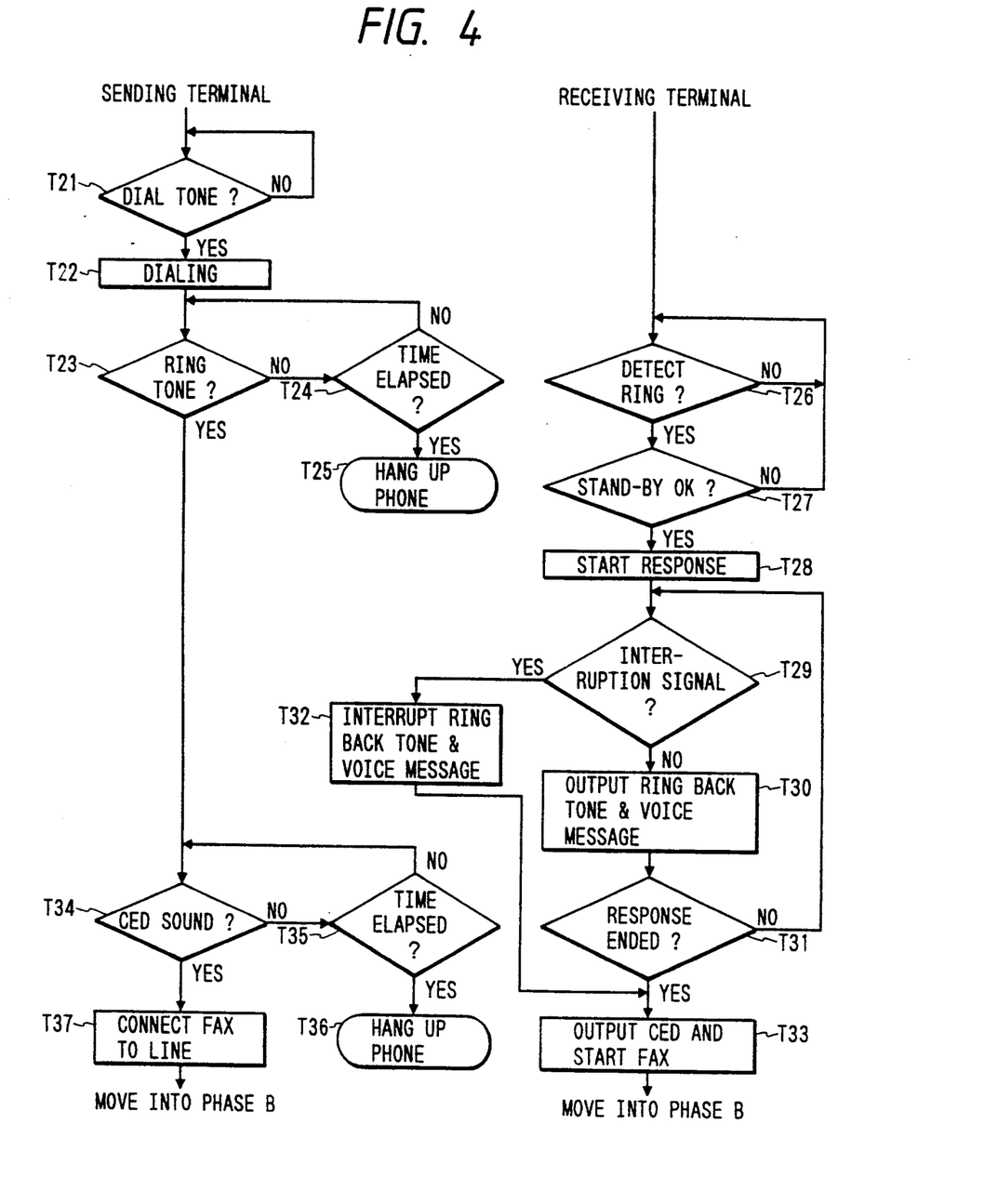
FIG. 4 is a flow chart illustrating a sending operation in a sending terminal and a receiving operation in a receiving terminal in the embodiment of the present invention.
Figure 5:
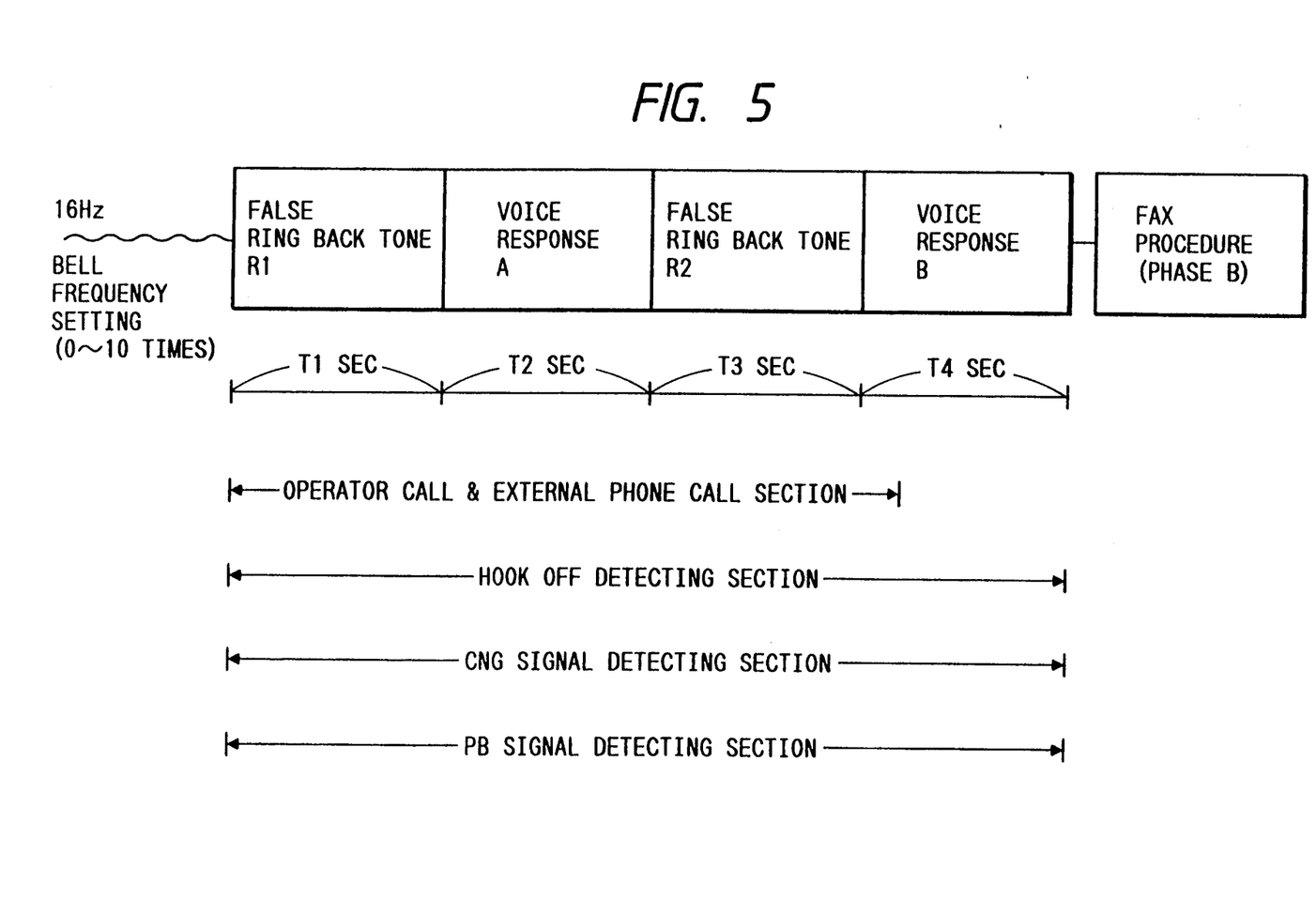
FIG. 5 is a view illustrating a part of the receiving operation in the receiving terminal of FIG. 4 in more detail.

A facsimile transmission operation of the image telecommunication apparatus constituted as described above is explained as follows, referring to FIGS. 4 to 6. FIG. 4 is a flow chart illustrating a sending operation in the sending terminal and a receiving operation in the receiving terminal in the embodiment of the present invention. FIG. 5 is a view illustrating a part of the receiving operation in the receiving terminal of FIG. 4 in more detail.

In the flow chart of FIG. 4, the sending terminal (i.e. sending facsimile machine) carries out its sending operation as follows. In a step T21, an operator of the sending terminal checks whether or not he can hear a dial tone, after setting a manuscript on the image reader 101. If the operator hears the dial tone in the step T21, he carries out a dialing operation in a step S22. In turn, it is checked whether or not a ring tone returns within a predetermined time through steps T23, T24. And, if the ring tone does not return within a certain long time, the operator hangs up the telephone in a step T25. To the contrary, if the ring tone returns, the operator keeps waiting a response coming back from the receiving terminal.

On the other hand, the receiving terminal (i.e. receiving facsimile machine) carries out its receiving operation as follows. In a step T26, it is checked whether or not the ring is detected in response to the dialing operation in the previous step T22 of the sending terminal. If the ring has been detected, it is further checked in a step T27 whether or not the receiving terminal is in a standby OK condition for subsequent receiving operation.

If it is judged that the receiving terminal is in a standby OK condition, the receiving terminal starts its receiving response procedure in a step T28. If entered in this receiving response procedure, the control unit 14 of the receiving terminal causes its external telephone 6 to ring. At the same time, in a step T29, it is checked by the PB signal detecting unit 16 whether or not the PB signal (i.e. the interruption signal) is detected. If the PB signal is not detected in the step T29, the control unit 14 sends out false ring back tones to notify that the receiving terminal is in a TEL-prioritized automatic receiving mode, together with voice messages store in the voice message storing portion 15 in a step T30. Subsequently, it is checked whether or not the response is ended in a step T31. If it is not finished yet, the program returns to the step T29.

One example of details of the steps T28 and T30 is shown in FIG. 5. As shown in FIG. 5, when a bell signal of 16 Hz is detected, first of all, a false ring back tone R1 is sent out for a time period of T1. And, subsequently, a voice response A is sent out for a time period of T2. The voice response A is outputted in a form of a recording announce or a speech synthesis, telling for example, "Now, it is calling. Please wait for a while."

After this voice response A, a false ring back tone R2 is sent out for a time period of T3. And, subsequently, a voice response B is sent out for a time period of T4. The voice response B is outputted similarly in a form of a recording announce or a speech synthesis, telling for example, "There is no one responding this call. If you want to send a facsimile, please send it after a beep sound"

A time duration after the sending-out of the false ring back tone R1 initiated until the voice response B is sent out corresponds to an operator call & external telephone call section for the receiving terminal. And, a time duration after the sending-out of the false ring back tone R1 is initiated until the sending-out of the voice response B is finished corresponds to a hook off period during which the receiving terminal waits someone picking up the handset of the external telephone 6, and also corresponds to a calling tone (i.e. CNG) detecting section. The calling tone (i.e. CNG) represents a calling side non-voice terminal. And also, in this embodiment, it should be noted that the time duration after the sending-out of the false ring back tone R1 is initiated until the sending-out of the voice response B is finished corresponds to a PB signal detecting section. Therefore, during the receiving response operation, it is always checked in the step T29 whether or not the PB signal is inputted.

Furthermore, if the PB signal is inputted, it is checked in a step T29 whether or not the inputted PB signal is the interruption signal by comparing it with the data stored in the ROM of the control unit 14. If the PB signal is identical with the data in the ROM, the CED signal is sent out in a step T33 and, in turn, the procedure moves into the phase B. The CED signal represents a called side terminal discriminating signal.

In this manner, by using the interruption signal, the receiving response operation can be forcibly finished at any timing of the time period of T (=T1+T2+T3+T4), which represents the maximum waiting time from the beginning of the ring back tone R1 to the end of the voice response B. Therefore, it becomes possible to promptly start the facsimile transmission. By the way, it is apparent that the CED signal is sent out after all the receiving response procedure is finished (i.e. the maximum time T has elapsed) in the step T31.

On the other hand, the sending terminal is in a hook off detecting condition after finishing the dialing operation and sending out the PB signal. Thus, the sending terminal is kept waiting for the CED by checking whether or not the CED sound is heard in a step T34. Then, if a certain long time has elapsed without listening the CED sound in steps 34, 35, the telephone is hung up in a step T36. To the contrary, if the CED sound is heard, the operator pushes down a start button for initiating the facsimile communication so as to connect the facsimile apparatus to the line 4 in a step T37 and, in turn, moves into the phase B.

Figure 6:
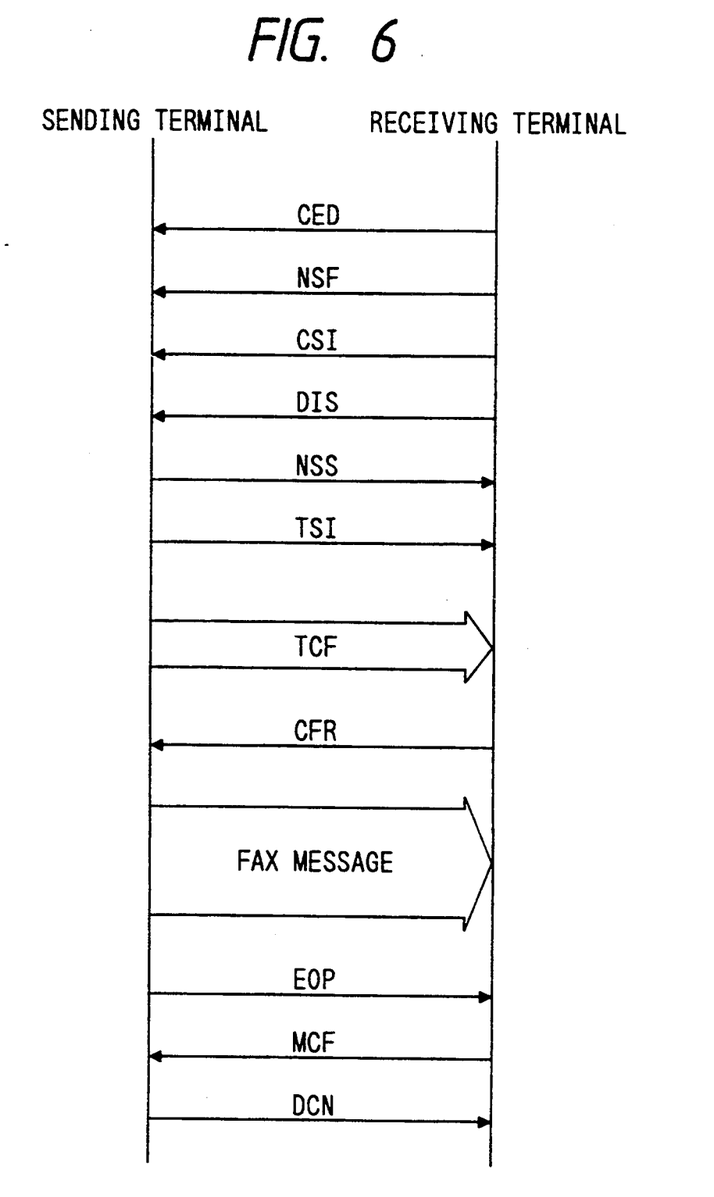
FIG. 6 is a sequence diagram showing a facsimile transmission procedure between the sending terminal and the receiving terminal after moving into a phase B.

FIG. 6 is a sequence diagram showing the facsimile transmission procedure between the sending terminal and the receiving terminal after moving into the phase B.

As apparent from FIG. 6, both the sending terminal and the receiving terminal move into the phase B upon sending and receiving the CED signal. After sending out the CED signal, the receiving terminal further sends out an NSF signal (i.e. a non-standard function discriminating signal), a CSI signal (i.e. called terminal discriminating signal), and a DIS signal (i.e. a digital discriminating signal). The NSF signal represents a transmission function of the receiving terminal. The CSI signal represents an international telephone number indicating called terminal. And, the DIS terminal represents a standard receiving function of the called terminal.

In response to these signals, the sending terminal sends out an NSS signal (i.e. a non-standard function setting signal) and a TSI signal (i.e. sending terminal discriminating signal). The NSS signal represents a command signal suggesting a function of the sending terminal selected among non-standard function expressed by the NSF signal. The TSI signal represents the sending terminal itself.

Furthermore, the sending terminal outputs a TCF signal (i.e. a training check signal) to the receiving terminal in order to confirm a training of the modem. The receiving terminal receiving this TCF signal, and returns a CFR signal (i.e. a receiving preparation confirmation signal).

At this moment, an image data transmission becomes possible between both sending and receiving terminals. Thus, a facsimile message is sent from the sending terminal to the receiving terminal. And, if all the facsimile message is sent out, the sending terminal outputs an EOP signal (i.e. a procedure ending signal) to notify that no document to be transmitted is remained. The receiving terminal returns MCF in response to the EOP signal. Moreover, the sending terminal outputs a DCN signal (i.e. a cut command signal) which indicate an end of all the operation and requires no response from the receiving terminal. By the DCN signal, both the sending terminal and the receiving terminal are disconnected from the line 4.

As is explained in the foregoing description, in accordance with the second aspect of the present invention, if the sending terminal sends out an interruption signal, the receiving terminal forcibly interrupts its ordinary receiving response procedure and enters into the phase B. Accordingly, it becomes possible to promptly begins the facsimile transmission procedure.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An image telecommunication apparatus comprising:
    an image telecommunication means performing an image telecommunication and an image processing;
    a memory means for storing shortening telephone numbers;
    a calling means for accessing to a line to carry out dialing operation;
    a mode detecting means for detecting a shortening dial command mode inputted from a dialing signal fed from an external telephone associated with the apparatus;
    a dialing number detecting means for detecting a dial number inputted from the dialing signal fed from the external telephone associated with the apparatus;

a first switch means for selectively outputting the dialing signal fed from the external telephone associated with the apparatus to one of said dial number detecting means or to the line;

a second switch means for selectively outputting either of the dialing signal fed from the calling means and the dialing signal fed from the external telephone associated with the apparatus to the line;

a third switch means for selectively connecting either of the second switch means and the image telecommunication means to the line; and a control means for effecting the dialing number detecting means to output the dial number to be inputted through said first switch means when the mode detecting means detects a shortening dial command mode, and reading out a telephone number corresponding to the dial number detected by the dialing number detecting means from said memory means so as to enable the calling means to carry out its dialing operation through said second and third switch means.

2. An image telecommunication apparatus in accordance with claim 1 in which, the external telephone includes means for inputting the dialing signal to the apparatus, and said control means controls said third switch means to connect the second switch means and the line in the case where a handset of the external telephone is in a hook up condition.

3. An image telecommunication apparatus in accordance with claim 2 in which, said control means outputs the inputted dialing signal directly to the line through said first, second, and third switch means when the mode detecting means does not detect the shortening dial command mode.

4. An image telecommunication apparatus in accordance with claim 1 in which, said control means outputs the inputted dialing signal directly to the line through said first, second, and third switch means when the mode detecting means does not detect the shortening dial command mode.

5. An image telecommunication apparatus in accordance with claim 1 further comprising input means for inputting dialing information and instructions to the apparatus, and wherein the external telephone connected to the apparatus includes an external input means for inputting dial number to the external telephone, whereby said input means of the apparatus and the external telephone each accesses shortening telephone numbers stored in said memory means.

* * * * *